(12) United States Patent
Cubizolle et al.

(10) Patent No.: US 8,685,527 B2
(45) Date of Patent: Apr. 1, 2014

(54) MEMBER FORMING A SUPPORT FOR A DEVICE, AND TIRE AND APPARATUS COMPRISING SUCH A MEMBER

(75) Inventors: Bernard Cubizolle, Cebazat (FR); Claudio Battocchio, Riom (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 296 days.

(21) Appl. No.: 12/682,865

(22) PCT Filed: Oct. 23, 2008

(86) PCT No.: PCT/FR2008/051914
§ 371 (c)(1),
(2), (4) Date: Jun. 29, 2010

(87) PCT Pub. No.: WO2009/056739
PCT Pub. Date: May 7, 2009

(65) Prior Publication Data
US 2010/0291345 A1    Nov. 18, 2010

(30) Foreign Application Priority Data
Oct. 23, 2007    (FR) .................................... 07 58521

(51) Int. Cl.
*B32B 3/02*       (2006.01)
*B32B 3/24*       (2006.01)
*B32B 3/30*       (2006.01)
*B60C 23/00*      (2006.01)
*B60C 23/04*      (2006.01)
*B60C 13/00*      (2006.01)

(52) U.S. Cl.
USPC ............ 428/172; 428/81; 428/120; 428/131; 428/137; 428/138; 428/156; 428/192; 428/343; 73/146; 152/367

(58) Field of Classification Search
USPC ............................................... 152/152.1, 367
See application file for complete search history.

(56) References Cited

U.S. PATENT DOCUMENTS

| 2,710,623 | A | * | 6/1955 | Kolos ............................ 137/223 |
| 3,034,558 | A | * | 5/1962 | Steer et al. .................... 152/429 |
| 3,468,359 | A | * | 9/1969 | Rutledge ....................... 152/367 |

(Continued)

FOREIGN PATENT DOCUMENTS

| DE | 102006004707 A1 * | 9/2006 | |
| DE | 102007030232 A1 * | 1/2009 | ............. B29D 30/00 |

(Continued)

OTHER PUBLICATIONS

Machine Translation of DE 102006004707 A1, Sep. 2006.*

*Primary Examiner* — Aaron S Austin
*Assistant Examiner* — Jeff Vonch
(74) *Attorney, Agent, or Firm* — Fitzpatrick, Cella, Harper & Scinto

(57) ABSTRACT

A member a support for a device includes a mass of rubber delimited by two substantially parallel opposite surfaces forming respectively a supporting surface and a surface for connection with a tire. The mass includes an opening arranged in the connecting surface delimiting a recess arranged in the mass, and the opening does not lead to outside of the connecting surface.

22 Claims, 3 Drawing Sheets

(56) References Cited

U.S. PATENT DOCUMENTS

| | | | |
|---|---|---|---|
| 4,540,035 A * | 9/1985 | Roberts | 152/367 |
| 5,562,787 A * | 10/1996 | Koch et al. | 156/64 |
| 5,971,046 A | 10/1999 | Koch et al. | 152/152.1 |
| 6,462,650 B1 | 10/2002 | Balzer et al. | 340/442 |
| 6,788,192 B2 * | 9/2004 | Shimura | 340/447 |
| 6,885,291 B1 * | 4/2005 | Pollack et al. | 340/445 |
| 2002/0174925 A1 | 11/2002 | Wilson et al. | 152/415 |
| 2004/0094251 A1 * | 5/2004 | Strache et al. | 152/152.1 |
| 2005/0044943 A1 | 3/2005 | Godeau et al. | 73/146 |
| 2005/0076982 A1 * | 4/2005 | Metcalf et al. | 152/152.1 |
| 2006/0016534 A1 | 1/2006 | Peyron et al. | 152/152.1 |
| 2006/0164250 A1 | 7/2006 | Kawai | 340/572.8 |
| 2007/0175554 A1 | 8/2007 | Bertrand | 152/152.1 |
| 2008/0251173 A1 | 10/2008 | Cubizolle | 152/152.1 |
| 2010/0230024 A1 | 9/2010 | Borot et al. | 152/450 |
| 2010/0276043 A1 | 11/2010 | Battocchio et al. | 152/151 |
| 2010/0276048 A1 | 11/2010 | Adamson et al. | 152/450 |
| 2010/0276563 A1 | 11/2010 | Cubizolle et al. | 248/633 |
| 2011/0226401 A1 | 9/2011 | Battocchio et al. | 152/548 |

FOREIGN PATENT DOCUMENTS

| | | | |
|---|---|---|---|
| EP | 0 389 406 A2 | 9/1990 | |
| EP | 906839 A2 * | 4/1999 | ............ B60C 19/00 |
| EP | 1 544 001 A1 | 6/2005 | |
| EP | 1 970 222 A1 | 9/2008 | |
| JP | 11-042915 A | 2/1999 | |
| JP | 2004-291855 A | 10/2004 | |
| JP | 2005-096423 A | 4/2005 | |
| JP | 2005-178761 A | 7/2005 | |
| JP | 2005-271695 A | 10/2005 | |
| JP | 2006021611 A * | 1/2006 | |
| JP | 2006-507495 A | 3/2006 | |
| JP | 2007-182142 A | 7/2007 | |
| WO | WO 99/29523 A1 | 6/1999 | |
| WO | WO 2004/016454 A1 | 2/2004 | |
| WO | WO 2004/048132 A1 | 6/2004 | |
| WO | WO 2005/082644 A1 | 9/2005 | |
| WO | WO 2006128529 A1 * | 12/2006 | |
| WO | WO 2007/000781 A1 | 1/2007 | |
| WO | WO 2007000781 A1 * | 1/2007 | ............ B60C 23/04 |

* cited by examiner

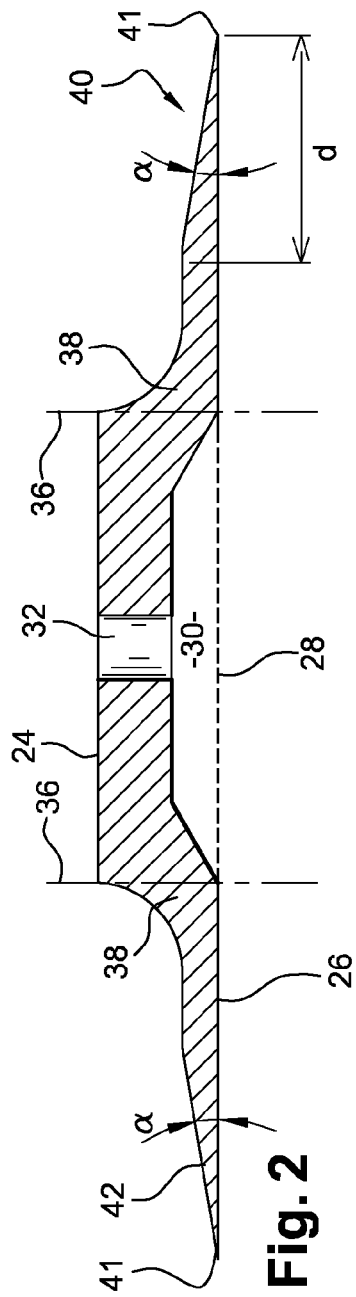
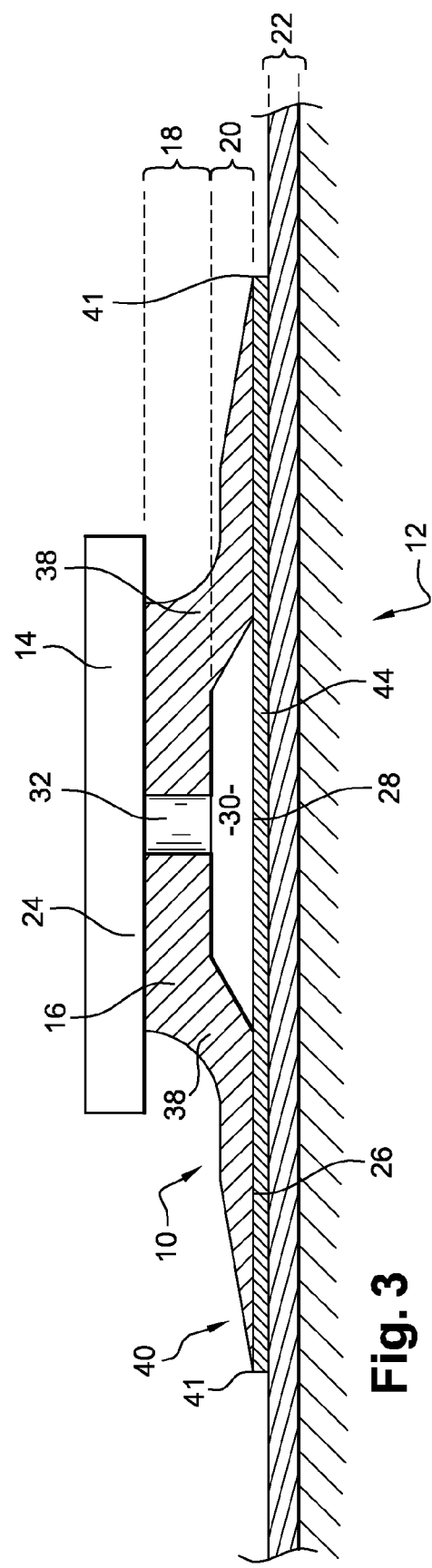

MEMBER FORMING A SUPPORT FOR A DEVICE, AND TIRE AND APPARATUS COMPRISING SUCH A MEMBER

The present invention relates to the technical field of tyres for motor vehicles.

More precisely, the invention relates to the attachment of a device, notably an electronic device, such as a pressure sensor, to a tyre. The electronic device is rigid and it is unadvisable to attach it directly to the tyre because that risks disrupting the mechanical behaviour of the tyre when running, notably when it deforms.

It is therefore known practice in the prior art, notably according to document EP-A1-1 544 001, to use a rubber member bonded to the surface of the tyre and forming a support for the electronic device. The rubber member is sometimes called a "patch".

This member produces a mechanical transition between the rigid device and the flexible tyre so that the device does not disrupt the behaviour of the tyre. This is sometimes called mechanical decoupling produced between the electronic device and the tyre.

The particular object of the invention is to propose a member which allows a better mechanical decoupling and, as a result, a better endurance of the assembly of the member to the surface of a tyre.

Accordingly, the subject of the invention is a member forming a support for a device comprising a mass of rubber delimited by two substantially parallel opposite surfaces forming respectively a supporting surface and a surface for connection with a tyre, the mass comprising an opening arranged in the connecting surface delimiting a recess arranged in the mass and the opening not leading to the outside of the connecting surface.

Preferably, the supporting surface extends at least partially in line with the surface of the opening.

By being in contact with the supporting surface, the device stiffens the mass of rubber and more particularly the portion of the mass that is situated in line with the supporting surface. Because of the recess, a portion of the mass stiffened by the device is not in contact with the tyre. Therefore, the portion of the device situated in line with the surface of the opening has no direct mechanical influence on the tyre. The result of this is that the recess of the member of the invention improves the mechanical decoupling between the device and the tyre.

The fact that the opening does not lead to the outside of the connecting surface only very slightly limits the surface of contact between the mass and the tyre and thus makes it possible for the member to retain excellent endurance. The presence of the recess also has the advantage of limiting the weight of the member which makes possible, in the case of a member and of a device that are suitable for a passenger vehicle, for the assembly to have a weight of less than 10 grams (g). It is thus possible to place the assembly on the surface of the tyre without worrying about the azimuth because there is practically no effect on the uniformity of the tyre and wheel assembly.

A member according to the invention may also comprise one or more of the following features.

The orthogonal projection of the supporting surface on the connecting surface coincides substantially with the opening arranged in the connecting surface. Therefore, the decoupling between the device and the tyre is excellent since the device has no direct mechanical influence on the tyre.

The ratio between the depth of the recess and the distance between the two surfaces, the supporting surface and the connecting surface, is between ¼ and ½, preferably substantially equal to ⅜. When this ratio is too low, there is a risk of the surface of the recess rubbing against the surface of the tyre; when this ratio is too high, the member becomes too flexible and can enter into resonance when running which very markedly limits its endurance.

The ratio between the surface of the opening and the surface of the mass of rubber in contact with the connecting surface is between 0.15 and 0.30. When this ratio is below 0.15, the mechanical decoupling associated with the recess becomes insufficient and when this ratio is too high, the surface area of connection with the tyre becomes insufficient to retain good endurance at high running speed.

The member comprises a channel arranged in the mass and leading to both the supporting surface and to the bottom of the recess. This channel makes it possible to correctly position the device on the supporting surface. It also makes it easier to bond the member to the tyre by preventing air being trapped in the recess. Finally, it allows a fluidic communication between the recess and the air inside the tyre by cooperating with a similar channel arranged in the device. Therefore variations of pressure or of temperature of the tyre do not cause pressure differences between the inside of the tyre and the inside of the recess which differences are sources of deformations of the member.

The peripheral edge of the connecting surface is delimited by a joining surface of opposite surfaces converging on their joining surface at an angle of between 9 and 15 degrees, preferably between 10 and 12 degrees. The angle of the borders of the member is an important parameter to be taken into consideration so that the attachment of the member to the tyre is durable. Specifically, if this angle is less than 9 degrees, folds can appear on the border of the member because it is difficult to correctly flatten its peripheral edge. If this angle is greater than 15 degrees, the peripheral edge of the member is too rigid so that it creates stresses that are too great on the surface of the tyre and causes cracks or peeling when running.

The joining surface of the peripheral edge is substantially a joining line.

The joining surface of the peripheral edge is normal to the connecting surface and has a height of between 0.1 and 0.2 mm.

The peripheral edge also comprises a cord of substantially rectangular section of the same thickness as the joining surface and extending outwards from 0 to 1.5 mm.

The member also comprises a layer of connecting rubber placed on the connecting surface without overlapping in line with the peripheral edge of the member.

A further subject of the invention is a tyre that comprises a member as defined above.

The invention will be better understood on reading the following description given only as an example and made with reference to the appended drawings in which:

FIG. 2 is a view in section of the member of FIG. 1 on the plane II-II of FIG. 1, and FIG. 3 is a view in section of the member of FIG. 1 when it is fitted to a tyre and it supports a device.

Figure 1:
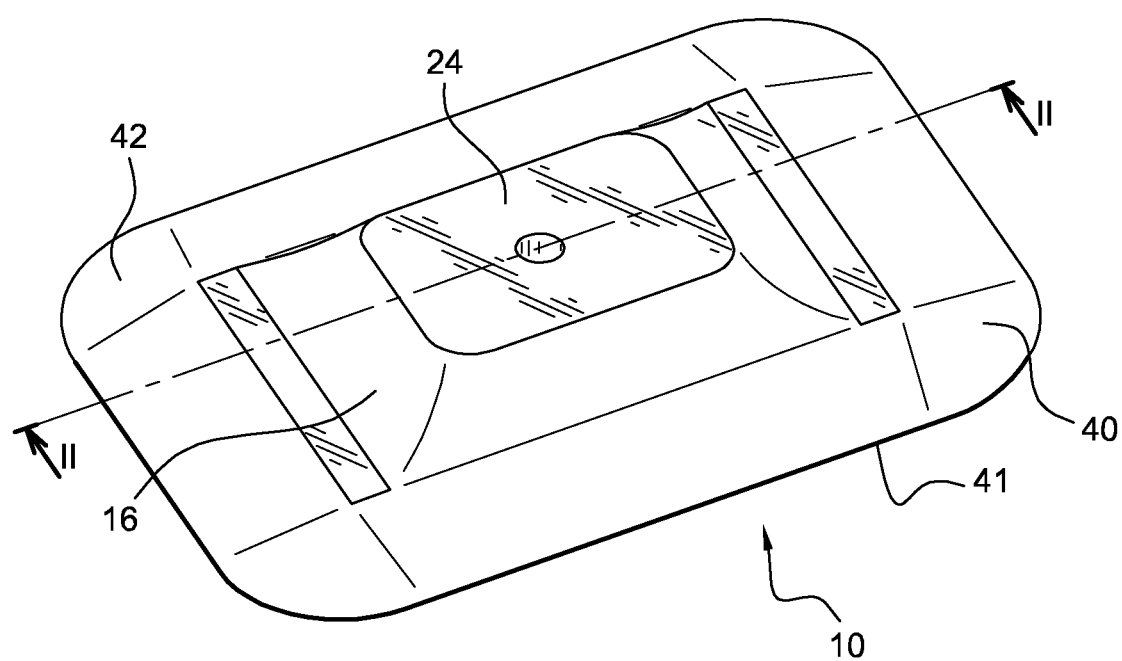
FIG. 1 is a view in perspective of a member according to the invention.

"Modulus of elasticity" of a rubber or rubbery mixture is understood to be a secant modulus of extension at 10% of deformation and at ambient temperature or specified temperature; the measurement is taken after a first cycle of accommodation up to 10% of deformation:

$$-E_{10} = \frac{F_{10}}{S \times \varepsilon_{10}} \text{ i.e. } E_{10} = \frac{F_{10}(1+\varepsilon_{10})}{S_0 \times \varepsilon_{10}} \text{ and } E_{10} = \frac{F_{10} \times 1.1}{S_0 \times 0.1}$$

in which $\varepsilon_{10}$ is equal to 0.1;
where $E_{10}$: secant modulus of extension at 10% of deformation; $F_{10}$: force of extension at 10% of extension; $S_0$: initial section of the test specimen; S: section of the test specimen at the deformation of extension $\varepsilon$, in the case of rubber material, it is known that:

$$S = \frac{S_0}{1+\varepsilon};$$

and $\varepsilon_{10}$ deformation of extension at 10%.

The figures show an example of a member according to the invention suitable for a passenger vehicle. The member is designated by the general reference number 10 and is designed to be fitted to a tyre 12 and to form a support for a device 14. This device 14 may be of various types, for example electronic (pressure sensor, temperature sensor, etc.), mechanical or other type.

The member 10 comprises a mass 16 of rubber which, as shown in FIG. 3, comprises a portion 18 for supporting the member 14 and a portion 20 for connecting with the tyre 12. The portions 18 and 20 are made in one piece and their separation is imaginary. The mass 16 of rubber is obtained by moulding.

The member 10 is designed to be fitted on a surface preferably inside the tyre. In FIG. 3, the member 10 is fitted to an internal sealing rubber 22 of the tyre 12. The internal rubber 22 forms a complementary portion for connecting the connecting portion 20 of the member 10.

The mass 16 of rubber is delimited by a surface 24 for supporting the member 14, the surface 24 being constituted by the upper surface of the supporting portion 18. The dimensions of the supporting surface 24 are approximately 15 millimeters×12 millimeters (mm). The device 14 carried by the supporting surface can have dimensions greater than those of the supporting surface 24 as shown in FIG. 3.

The mass 16 of rubber is also delimited by a surface 26 for connecting with the tyre 12, opposite to the supporting surface 24 and substantially parallel to the latter. The connecting surface 26 is constituted by the lower surface of the connecting portion 20 of the member 10. The dimensions of the connecting surface 26 are approximately 40 mm×32 mm.

The two surfaces 24 and 26 are substantially flat and are approximately 4 mm apart from one another.

The member 10 comprises an opening 28 arranged in the connecting surface 26 and delimiting a recess 30 arranged in the mass 16. The opening 28 is represented in dashed line in FIG. 2. The depth of the recess 30 is approximately 1.5 mm.

It will be noted that, because of the presence of the recess 30 in the mass 16, there is at least one imaginary sectional plane of the mass 16 substantially parallel to the opposite surfaces 24 and 26 in which the section of the mass 16 has a generally annular shape.

The mass 16 is formed so that the supporting surface 24 extends at least partially in line with the surface of the opening 28. In other words, the orthogonal projection of the surface 24 onto the connecting surface 26 delimits the surface of the opening 28.

In the example shown in FIG. 2, the orthogonal projection of the supporting surface 24 onto the connecting surface 26, symbolized by projection lines 36, coincides substantially with the opening 28.

Because of the recess 30, the portion of the mass 16 that is situated in line with the connecting surface 24 and which is therefore made rigid by the presence of the device 14, is not in contact with the internal rubber 22 of the tyre 12.

The supporting portion 18 is connected to the connecting portion 20 by bridges of material 38 connected to the periphery of the supporting portion 18. These bridges of material 38 are not very thick, for example 4 mm thick, so they are flexible and they allow a relative movement of the two portions 18 and 20, notably in the case of deformations of the tyre 12 or vibrations of the device 14. This makes it possible to further enhance the mechanical decoupling between the tyre 12 and the device 14.

The mass of rubber optionally also comprises a channel 32 that is arranged in the supporting portion 18 of the mass 16 and that leads on one side to the supporting surface 24 and on the other side to the bottom of the recess 30. This channel makes it possible to correctly position the device 14 on the supporting surface 24. It also makes it easier to stick the member 10 to the tyre while avoiding trapping air in the recess 30. Finally, it allows a fluidic communication between the recess 30 and the air inside the tyre by cooperating with a similar channel arranged in the device. Therefore, variations in pressure or in temperature of the tyre do not cause pressure differences between the inside of the tyre and the inside of the recess which differences are sources of deformations of the member.

The rubber used for producing the connecting portion 20 of the mass 16 is a rubber the modulus of extension of which, at 10%, is at most equal to that of the tyre 12. In other words, the connecting portion 20 is more flexible than the internal rubber 22. As an example, for a modulus of extension at 10% of the internal rubber 22 of the tyre equal to 2.2 MPa at 65° C., to manufacture the member 10, a rubber should be chosen having a modulus of extension at most equal to 2.2 MPa at 65° C. For good endurance of the assembly, the modulus of the rubber of the member should comply with this limit value throughout the whole temperature range of the tyre when running, for example between 0 and 80 degrees Celsius. The rubber used may be natural or synthetic.

The connecting portion 20 of the member 10 comprises a peripheral edge 40 delimited by the joining line 41 between the connecting surface 26 and an upper surface 42 of the connecting portion 20. For manufacturing purposes, and notably to make venting easier during moulding, the joining line 41 can be of a thickness different from zero but can be very thin, of the order of 0.1 to 0.2 mm. In this case, it is then called the joining surface 41. The two surfaces 26 and 42 converge on the joining line 41 and, between them, close to the line 41, form an angle α of between 9 and 15°, preferably between 10 and 12°.

As shown in FIG. 3, the member 10 is secured to the tyre 12 by means of a connecting material 44, inserted between the connecting surface 26 of the member 10 and the internal rubber 22. This connecting layer 44 extends over the whole length of the connecting surface 26 but does not protrude. In other words, the connecting layer 44 is flush with the peripheral edge 41.

Preferably, the angle α between the two surfaces 26 and is between 10 and 12 degrees in a zone of the peripheral edge 40 that extends up to a distance d of approximately 7 mm from the joining line 41.

Figure 4:
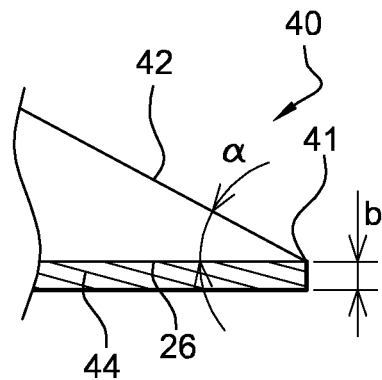
FIGS. 4 to 6 are enlarged views in section of several embodiments of a peripheral edge of a member.
Figure 5:
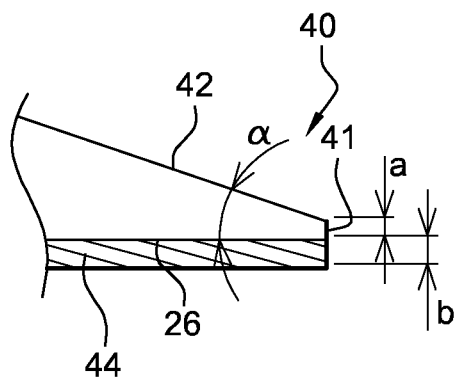
Figure 6:
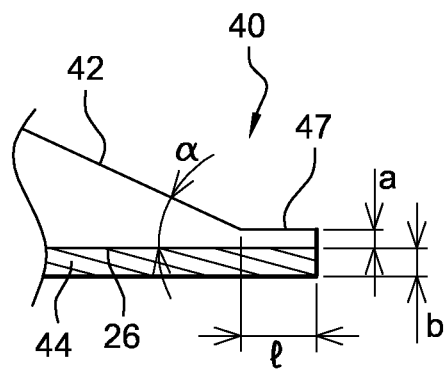

FIGS. 4 to 6 show in section enlargements of three embodiments of the peripheral edge 40.

In FIG. 4, the two surfaces 26 and 42 join to form a joining line 41, that is to say a joining surface 41 of zero thickness.

In FIG. 5, the peripheral edge 40 is delimited by a joining surface 41 that is normal to the surface 26 and has a thickness a of the order of 0.1 to 0.2 mm.

In FIG. 6, the peripheral edge 40 comprises a cord 47 that has a rectangular section and that extends over a distance 1 of between 0 (as in FIG. 5) and approximately 1.5 mm.

The presence of this cord 47 and of the joining surface 41 make it easier to vent the moulds for manufacturing the members. It is also possible to use vents for example in other locations and maintain a geometry as illustrated in FIG. 4.

FIGS. 4 to 6 also show the layer 44 of connecting rubber placed against the connecting surface 26, with a thickness b of the order of 0.3 mm. This layer of connecting rubber ends at the peripheral edge without going beyond the cord or the surface or the joining line.

Finally, the invention is not limited to the example described above since it is possible, for example, to use all geometries for the supporting portions of the device and a plurality of recesses in the mass 16.

The invention claimed is:

1. An electronic apparatus mountable on a tire, the electronic apparatus comprising:
    an electronic device; and
    a member for attaching the electronic device to an interior surface of a tire, the member being formed of at least a mass of rubber structured to include:
    a connecting portion that connects with a tire and includes:
        a peripheral connecting surface,
        an upper surface, and
        a peripheral end, and
    a supporting portion that includes:
        a first surface supporting the electronic device, and
        a second surface opposite the first surface,
    wherein the connecting portion extends from a peripheral portion of the second surface of the supporting portion, such that the connecting portion in combination with the supporting portion form a structure with an opening arranged in the connecting portion delimiting a recess, the recess being a non-open recess having a closed outer perimeter,
    wherein the recess is delimited by and located adjacent the second surface of the supporting portion and the recess is surrounded by the connecting portion,
    wherein the peripheral connecting surface:
        faces a surface of the tire,
        surrounds the opening of the recess proximate the surface of the tire, and
        is supported by the surface of the tire,
    wherein the second surface of the supporting portion faces the surface of the tire through the opening of the recess and is separated from the tire by the recess, such that the first and second surfaces of the supporting portion are interposed between the electronic device and the surface of the tire,
    wherein the first surface of the supporting portion is substantially parallel to the peripheral connecting surface of the connecting portion, and
    wherein the supporting portion and the connecting portion are formed integrally with each other.

2. The electronic apparatus according to claim 1, wherein an edge of the first surface of the supporting portion is aligned at least partially with an edge of the recess located adjacent the peripheral connecting surface.

3. The electronic apparatus according to claim 1, wherein an orthogonal projection of the first surface of the supporting portion onto the peripheral connecting surface of the connecting portion aligns substantially with an edge of the recess located adjacent the peripheral connecting surface.

4. The electronic apparatus according to claim 1, wherein a ratio of a depth of the recess, which extends from the second surface to the opening of the recess proximate the surface of the tire, to a distance between the first surface of the supporting portion and the peripheral connecting surface of the connecting portion is between ¼ and ½.

5. The electronic apparatus according to claim 1, wherein a ratio of a surface area of the opening of the recess proximate the surface of the tire to a surface area of the peripheral connecting surface of the connecting portion is between 0.15 and 0.30.

6. The electronic apparatus according to claim 1, further comprising a channel arranged in the mass of rubber, wherein the channel extends from the first surface of the supporting portion to the recess located adjacent the second surface of the supporting portion.

7. The electronic apparatus according to claim 1, wherein the peripheral end of the connecting portion includes a joining portion that joins the upper surface and the peripheral connecting surface, and wherein the upper surface and the peripheral connecting surface form an angle of between 10 and 12 degrees.

8. The electronic apparatus according to claim 7, wherein the joining portion of the peripheral end is substantially a joining line at which the upper surface meets the peripheral connecting surface.

9. The electronic apparatus according to claim 7, wherein the joining portion of the peripheral end includes a ledge arranged normal to the peripheral connecting surface and having a height of between 0.1 and 0.2 mm.

10. The electronic apparatus according to claim 9, wherein the peripheral end includes a cord extending from the ledge, the cord having substantially a rectangular cross-section with a height same as that of the ledge and extending outwards from the ledge up to 1.5 mm.

11. The electronic apparatus according to claim 1, further comprising a layer of connecting rubber positioned on the surface of the tire without extending beyond the peripheral end of the connecting portion.

12. The electronic apparatus according to claim 1, wherein the member is incorporated in a tire.

13. The electronic apparatus according to claim 1, wherein a section of the mass of rubber parallel to the second surface and delimiting the recess has an annular shape.

14. A tire comprising:
    an interior surface;
    an electronic device; and
    a member for attaching the electronic device to the interior surface, the member being formed of at least a mass of rubber structured to include:
        a connecting portion that connects with a tire and includes:
            a peripheral connecting surface,
            an upper surface, and
            a peripheral end, and
        a supporting portion that includes:
            a first surface supporting the electronic device, and
            a second surface opposite the first surface, wherein the connecting portion extends from a peripheral portion of the second surface of the supporting portion, such that the connecting portion in combination with the supporting portion form a structure with an opening arranged in the connecting portion delimiting a recess, the recess being a non-open recess having a closed outer perimeter, wherein the recess is delimited by and located adjacent the second surface of the supporting portion and the recess is surrounded by the connecting portion, wherein the peripheral connecting surface:
  faces a surface of the tire,
    surrounds the opening of the recess proximate the surface of the tire, and
  is supported by the surface of the tire,
wherein the second surface of the supporting portion faces the surface of the tire through the opening of the recess and is separated from the tire by the recess, such that the first and second surfaces of the supporting portion are interposed between the electronic device and the surface of the tire,
wherein the first surface of the supporting portion is substantially parallel to the peripheral connecting surface of the connecting portion, and
wherein the supporting portion and the connecting portion are formed integrally with each other.

15. The tire according to claim 14, wherein an edge of the first surface of the supporting portion is aligned at least partially with an edge of the recess located adjacent the peripheral connecting surface.

16. The tire according to claim 14, wherein an orthogonal projection of the first surface of the supporting portion onto the peripheral connecting surface of the connecting portion aligns substantially with an edge of the recess located adjacent the peripheral connecting surface.

17. The tire according to claim 14, wherein a ratio of a depth of the recess, which extends from the second surface to the opening of the recess proximate the surface of the tire, to a distance between the first surface of the supporting portion and the peripheral connecting surface of the connecting portion is between ¼ and ½.

18. The tire according to claim 14, wherein a ratio of a surface area of the opening of the recess proximate the surface of the tire to a surface area of the peripheral connecting surface of the connecting portion is between 0.15 and 0.30.

19. The tire according to claim 14, wherein the member further includes a channel arranged in the mass of rubber, and wherein the channel extends from the first surface of the supporting portion to the recess located adjacent the second surface of the supporting portion.

20. The tire according to claim 14, wherein the peripheral end of the connecting portion includes a joining portion that joins the upper surface and the peripheral connecting surface, and wherein the upper surface and the peripheral connecting surface form an angle of between 10 and 12 degrees.

21. The tire according to claim 14, wherein the electronic device is supported by the supporting portion during running of the tire.

22. The electronic apparatus according to claim 1, wherein the electronic device is supported by the supporting portion during running of the tire.

* * * * *

UNITED STATES PATENT AND TRADEMARK OFFICE
CERTIFICATE OF CORRECTION

| | |
|---|---|
| PATENT NO. | : 8,685,527 B2 |
| APPLICATION NO. | : 12/682865 |
| DATED | : April 1, 2014 |
| INVENTOR(S) | : Bernard Cubizolle et al. |

It is certified that error appears in the above-identified patent and that said Letters Patent is hereby corrected as shown below:

On the Title Page

Item [57] Abstract

Line 1, "A member a" should read --A member forming a--.

In the Specification

Column 5

Line 1, "26 and is" should read --26 and 42 is--.

Signed and Sealed this
Seventeenth Day of October, 2017

Joseph Matal
*Performing the Functions and Duties of the
Under Secretary of Commerce for Intellectual Property and
Director of the United States Patent and Trademark Office*